United States Patent [19]
Park et al.

[11] Patent Number: 6,082,098
[45] Date of Patent: Jul. 4, 2000

[54] IGNITION SYSTEM FOR ROCKET ENGINES

[75] Inventors: John W. Park; Durward B. Smith, II; Paul Horn, all of Palm Beach Gardens, Fla.

[73] Assignee: United Technologies Corporation, Hartford, Conn.

[21] Appl. No.: 09/069,133

[22] Filed: Apr. 29, 1998

[51] Int. Cl.[7] .................................................. F02K 9/95
[52] U.S. Cl. ................................. 60/258; 60/39.826
[58] Field of Search .................... 60/39.821, 39.826, 60/257, 258

[56] References Cited

U.S. PATENT DOCUMENTS

| | | | |
|---|---|---|---|
| 3,085,393 | 4/1963 | Hamlin | 60/39.821 |
| 3,106,059 | 10/1963 | Ledwith | 60/258 |
| 4,707,982 | 11/1987 | Wagner | 60/258 |
| 5,456,065 | 10/1995 | Dargies | 60/258 |

*Primary Examiner*—Louis J. Casaregola
*Attorney, Agent, or Firm*—Christopher T. Hayes

[57] ABSTRACT

An ignition system for a rocket engine which improves the reliability of engine re-ignition by supplying additional oxygen to the ignitor directly from the rocket engines main fuel/oxygen injector elements, thereby eliminating the need for a supplemental oxygen supply system.

4 Claims, 5 Drawing Sheets

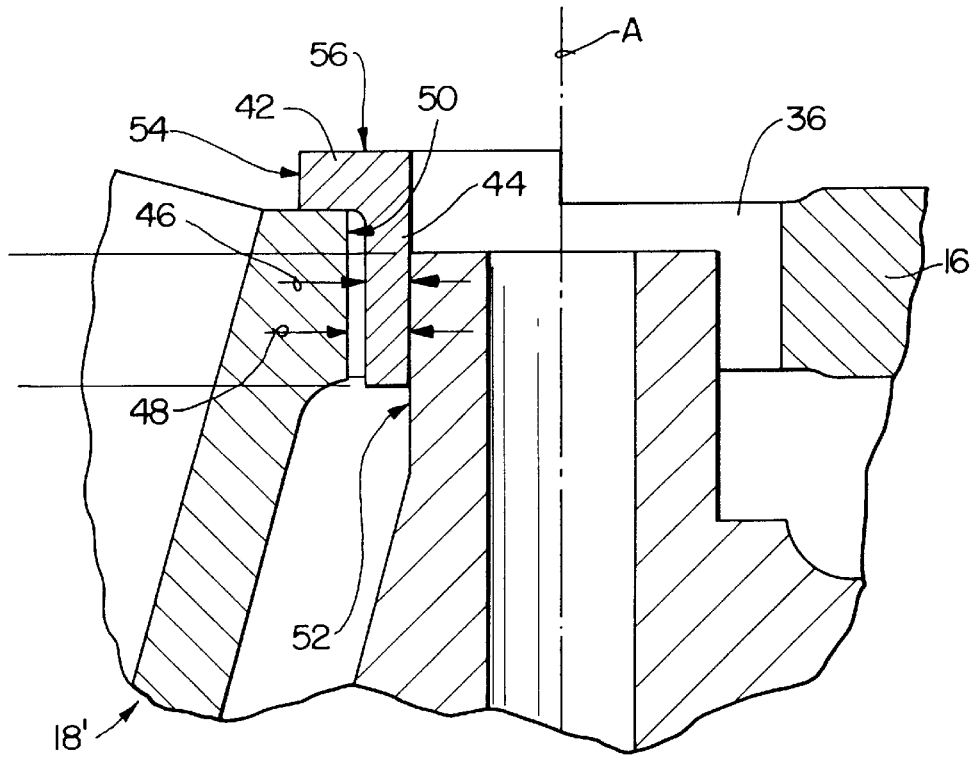
FIG. 5
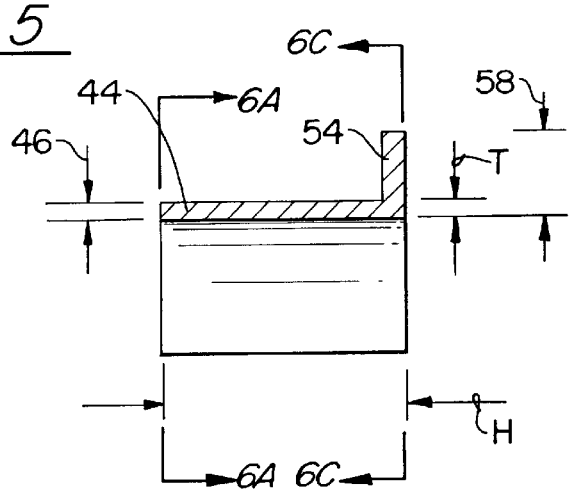
FIG. 6A
FIG. 6B
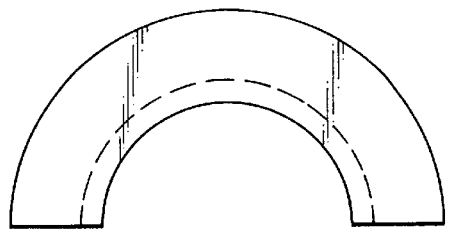
FIG. 6C

IGNITION SYSTEM FOR ROCKET ENGINES

TECHNICAL FIELD

This invention relates to ignition systems for liquid fueled rocket engines, and more specifically, to an efficient system which increases the reliability of engine re-lights on multiple ignition launches.

BACKGROUND OF THE INVENTION

Liquid fueled rocket engines are commonly used as upper stage propulsion systems on multiple stage launch vehicles. During a typical launch, for example, the placing of a satellite in near Earth orbit, an upper stage rocket engine may fire briefly, then coast, then fire again. Multiple firings of an engine during a single launch requires a highly reliable ignition system that is capable of multiple engine re-lights.

Ignition systems of the prior art typically include a supplemental oxidizer supply line to provide additional oxidizer to the region surrounding the engine's ignitor during ignition to ensure proper lighting for re-lighting of the fuel/oxidizer mixture in the rocket engines combustion chamber. While supplying additional oxidizer to the ignitor has proven to produce a desirable fuel/oxidizer ratio at ignition, the supplemental oxidizer supply line requires a shut-off valve to avoid over-heating. Combustion products back flow into the valve during the start-up pressurization of the engine, causing the valve to freeze closed. With the valve frozen closed for subsequent re-light attempts, the engine will not light reliably. Attempts to accommodate and/or eliminate back flow have proven to be ineffective at preventing freezing of the shut-off valve.

What is needed is an ignition system for liquid fueled rocket engines that increases the reliability of engine re-light on launches requiring multiple firings of the engine, while reducing the cost and weight of ignition systems of the prior art.

SUMMARY OF THE INVENTION

It is therefore an object of the present invention to provide an ignition system for liquid fueled rocket engines that increases the reliability of engine re-light on launches requiring multiple firings of the engine.

Another object of the present invention is to reduce the weight of the ignition systems for liquid fueled rocket engines.

Another object of the present invention is to reduce the cost of the ignition systems for liquid fueled rocket engines.

Accordingly, an ignition system for a rocket engine is disclosed having an ignitor, a faceplate having a centrally located ignitor port and first and second annular sections located radially outward of the port, the first annular section located radially inward of the second annular section, the ignitor mounted to the ignitor port, a plurality of first injector elements located in the first annular section of the faceplate and a plurality of second injector elements located in the second annular section, each of the injector elements having a first orifice defining a first flow area, and a second orifice defining a second flow area, the second orifice concentric with and radially outward of the first orifice relative to the first orifice and having a radially inner half and a radially outer half, the radially inner half located between the radially outer half and the ignitor port, each of the first injector elements located equidistant from the ignitor port, and, at least one insert located in the second orifice of one of the first injector elements, thereby reducing the second flow area of the second orifice in which the insert is located.

The foregoing and other features and advantages of the present invention will become more apparent from the following description and accompanying drawings.

BRIEF DESCRIPTION OF THE DRAWINGS

FIG. 5 is a cross-sectional view of one of the injector elements in which an insert is located taken along line 5—5 of FIG. 4.

FIG. 6 is a cross-sectional view and two end views of the insert of the present invention.

BEST MODE FOR CARRYING OUT THE INVENTION

Figure 1:
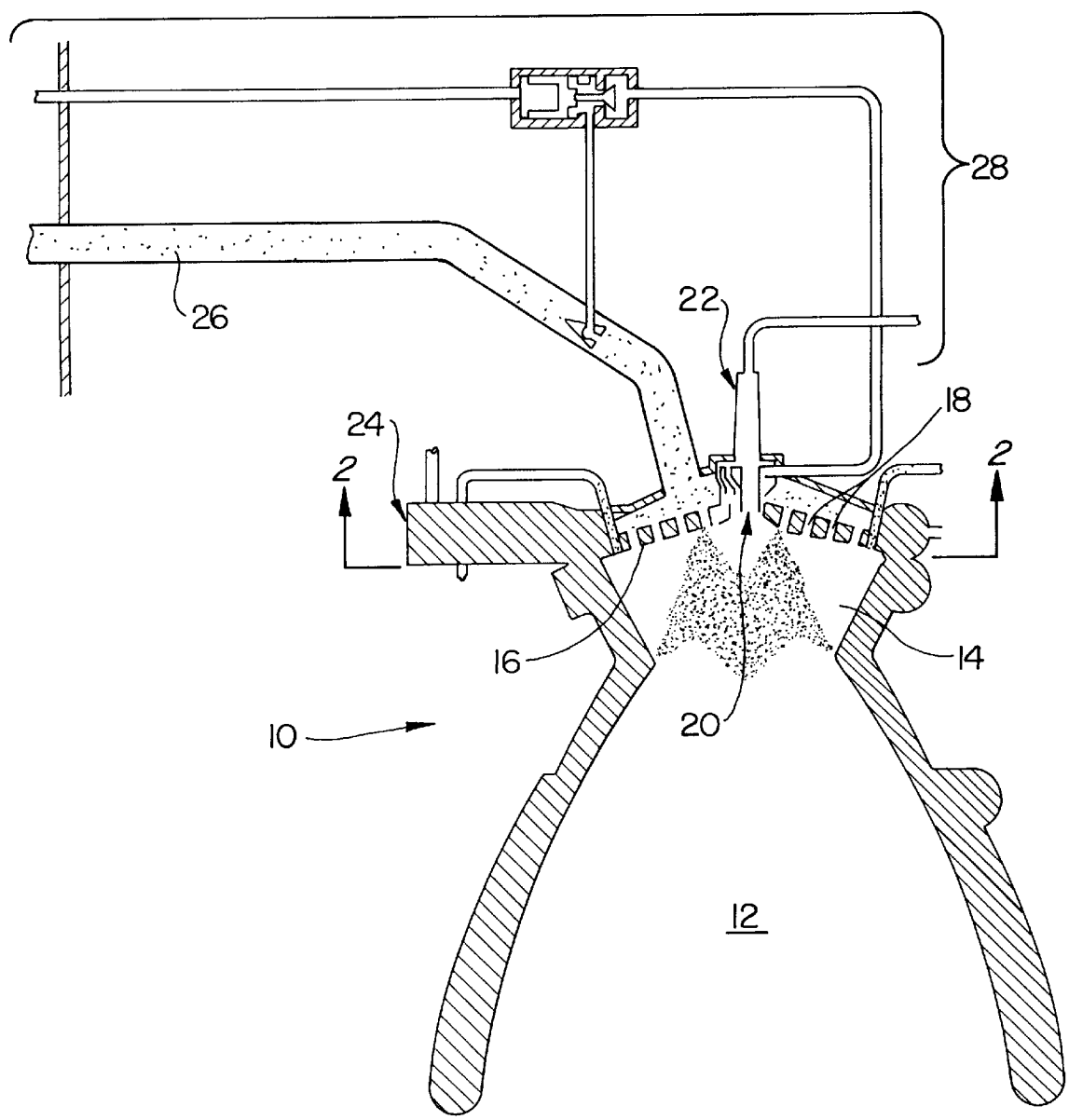
FIG. 1 is a schematic view of the rocket engines of the prior art.

As shown schematically in FIG. 1, a typical rocket engine 10 includes a thrust chamber 12, a combustion chamber 14 upstream of the thrust chamber 12, a faceplate 16 which contains a plurality of fuel/oxidizer injector elements 18 and an ignitor port 20, and an ignitor 22 mounted to the ignitor port 20, a fuel supply line 24 and an oxidizer supply line 26 for supplying fuel and oxidizer to the fuel/oxidizer injector elements 18, and a supplemental oxidizer supply system 28 for supplying additional oxidizer to the ignitor 22 during ignition.

Figure 2:
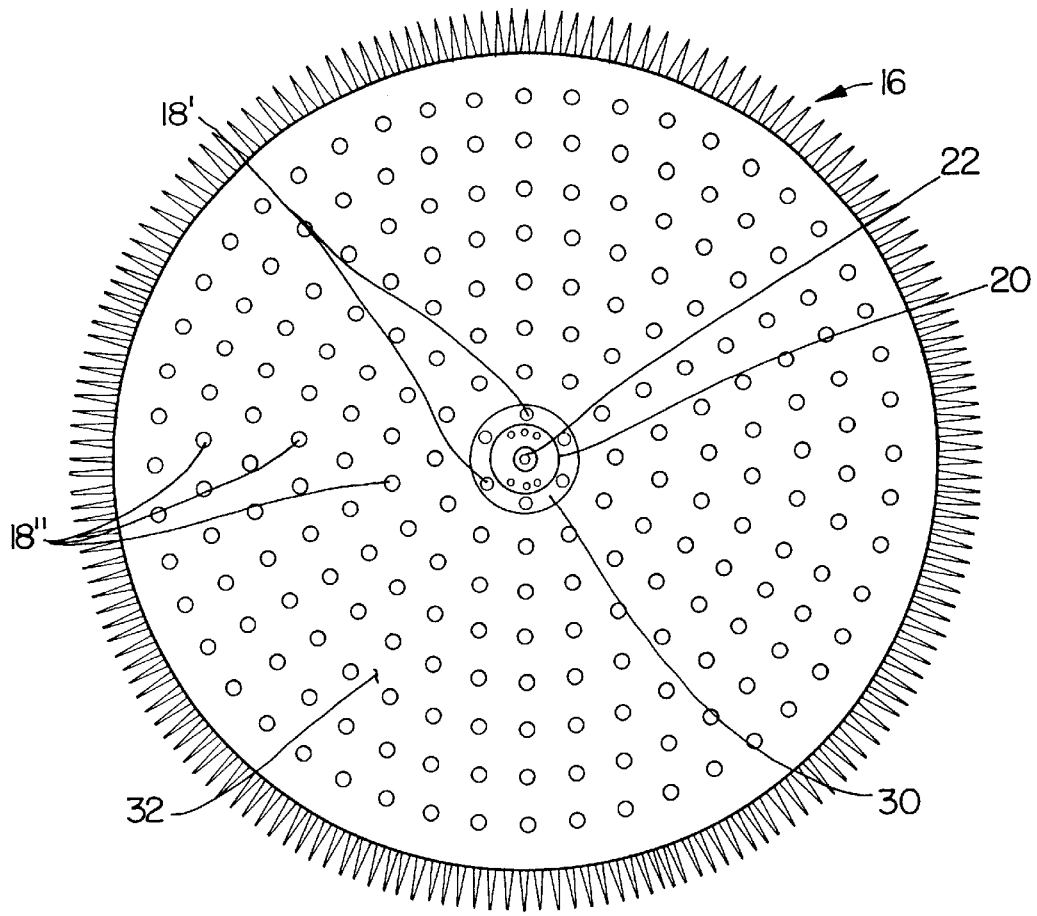
FIG. 2 is a plan view of the faceplate of the present invention taken along line 2—2 of FIG. 1.
Figure 3:
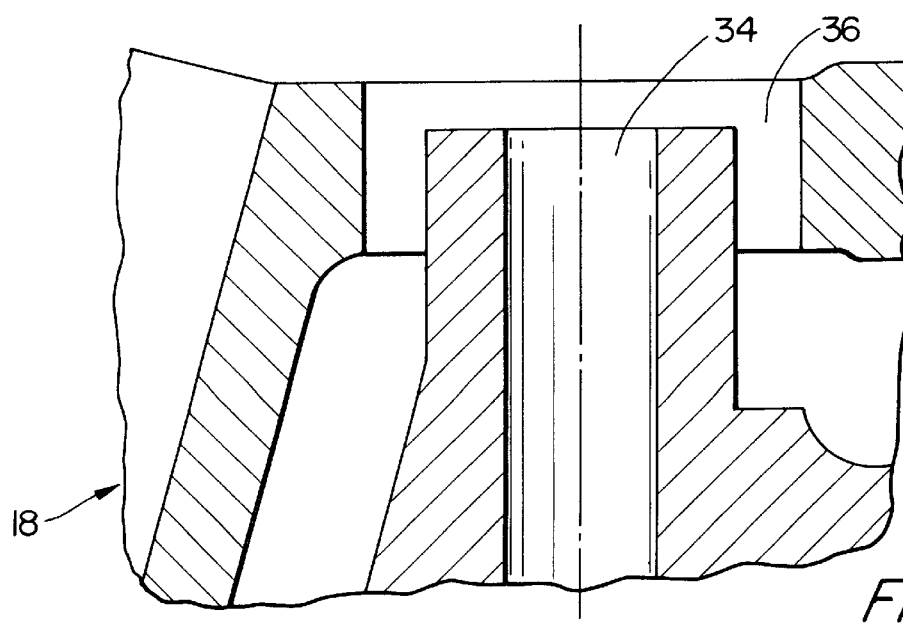
FIG. 3 is a cross-sectional view of one of the injector elements of the present invention taken along line 3—3 of FIG. 4.

As shown in FIG. 2, the faceplate 16 of the present invention has a centrally located ignitor port 20 and the ignitor 22 is mounted to the ignitor port 20. Radially outward of the port 20 is a first annular section 30 of ignitor elements 18, and radially outward of the first annular section 30 is a second annular section 32 of ignitor elements 18. A plurality of first injector elements 18' are located in the first annular section 30 of the faceplate 16 and a plurality of second injector elements 18' are located in the second annular section 32. Each of the injector elements 18 has a first orifice 34 defining a first flow area, and a second annular orifice 36 defining a second flow area. The second annular orifice 36 is concentric with and radially outward of the first orifice 34 relative to the first orifice 34. In the ignition system of the present invention, the first orifice 34 of each injector element 18 provides oxidizer to the combustion chamber 14, and the second annular orifice 36 provides fuel to the combustion chamber 14.

Figure 4:
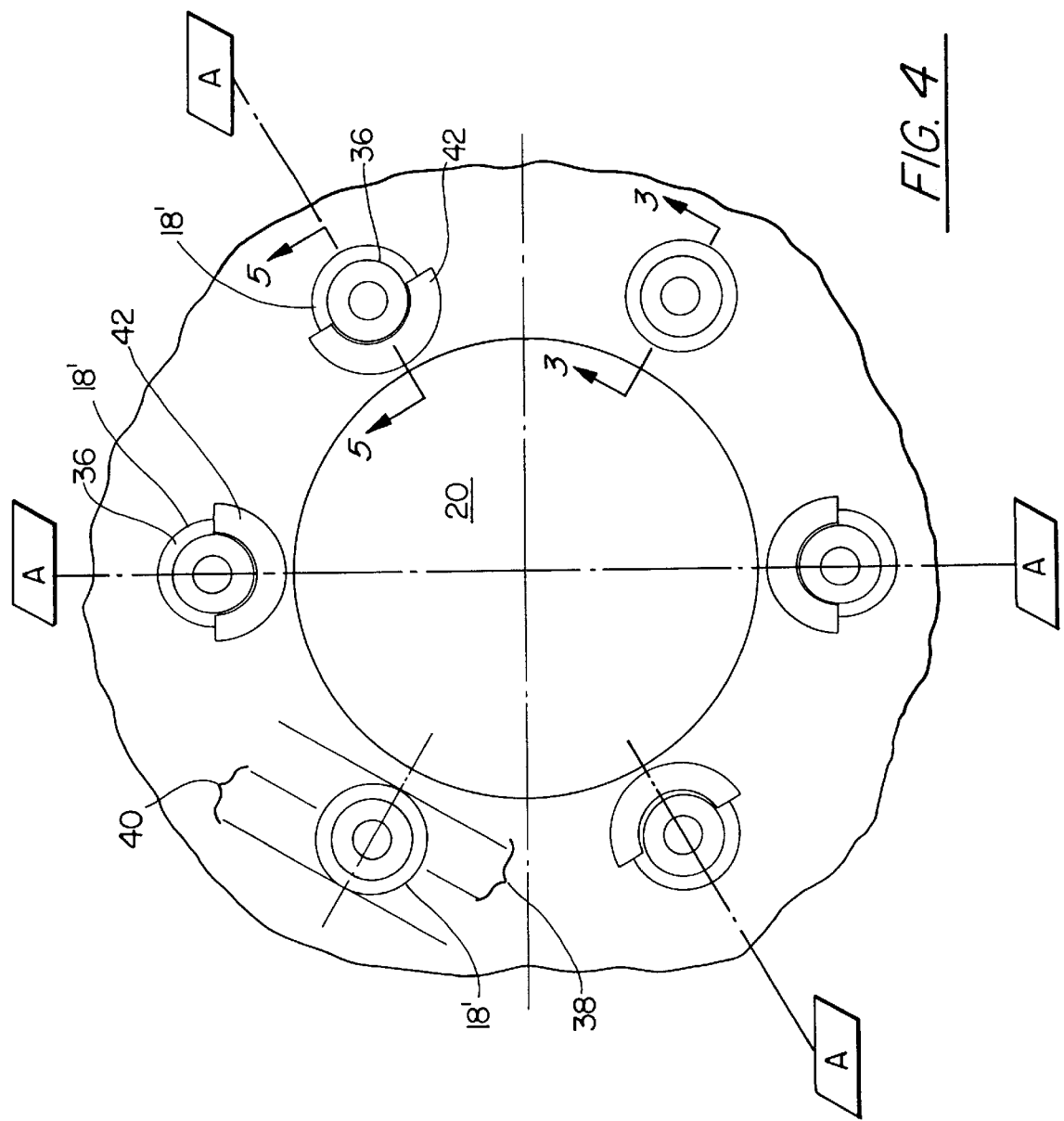
FIG. 4 is an enlarged view of the first annular section and ignitor port of FIG. 2.

Each of the first injector elements 18' is located equidistant from the ignitor port 20, and as shown in FIG. 4, the second annular orifice 36 of each of the first injector elements 18' has a radially inner half 38 and a radially outer half 40. The radially inner half 38 is located between the radially outer half 40 and the ignitor port 20. At least one, and preferably several of the first injector elements 18' includes an insert 42 located in the second orifice 36 thereof. As shown in FIGS. 4 & 5, the insert blocks a portion of the second annular orifice 36, thereby reducing the second flow area of the second annular orifice 36 in which the insert 42 is located.

As shown in FIGS. 5 & 6, the insert 42 comprises a semi cylindrical wall 44 having a thickness 46 that is only slightly less than the width 48 of the second annular orifice 36 in which the insert 42 is located. As used herein, the term "semi cylindrical wall" means a body generated by rotating a rectangular area having a thickness "T" and a height "H" at a distance "R" about a reference axis "A" for less than one complete revolution. For the insert 42 of the present invention, the semi cylindrical wall 44 results from one half of a rotation about the reference axis A, and the thickness 46 is slightly less than the radial width 48 of the second annular orifice 36. As used herein, the term "width of the second annular orifice" means the distance 48 between the radially inner surface 50 of the second annular orifice 36 and the radially outer surface 52 of that annular orifice 36, as shown in FIG. 5. A flange 54 which is integral with one end 56 of the semi cylindrical wall 44 extends radially outward therefrom in a direction that is substantially perpendicular to the reference axis "A". As shown in FIG. 6, the length 58 of the flange 54 is preferably at least half of the height "H" of the semi cylindrical wall 44. The insert 42 is preferably made of the same material as the faceplate 16, but may be made of a similar material having similar material properties as the material from which the faceplate 16 is made.

As shown in FIG. 4, in the preferred embodiment of the present invention there are six injector elements 18' in the first annular section of the faceplate 16, and the injectors 18' are spaced equally about the circumference of the ignitor port 20. Inserts 42 are located in the radially inner half 38 of the second orifice 36 of at least half of the first injector elements 18'. As those skilled in the art will readily appreciate, the insert 42 reduces the second flow area of the second orifice 36 in which the insert 42 is located by approximately 50 percent, and since fuel is delivered through the second annular orifice 36 of each of the injectors 18, fuel flow through each of the first injector elements 18' in which the insert 42 is located is reduced by approximately 50 percent. Consequently, the inserts 42 produce a fuel-lean (oxidizer-rich) zone immediately adjacent to the ignitor elements 18' in which the inserts 42 are located. Preferably, each of the first injector elements 18' in which an insert 42 is located is immediately adjacent another first injector element 18' in which an insert 42 is located and immediately adjacent another first injector element 18' in which an insert 42 is not located. Preferably, the first injector elements 18' in which inserts 42 are not located are immediately adjacent two first injector elements 18' in which inserts 42 are located. The inserts 42 are fixedly secured to the faceplate 16, preferably by welding the flange 54 thereto.

Immediately prior to engine ignition, fuel and oxidizer are fed to all of the injector elements 18 by the fuel supply line 24 and the oxidizer supply line 26, respectively. Due to the presence of the inserts 42 in the radially inner half 38 of the second annular orifice 36 of some of the first injector elements 18', fuel spray from the second annular orifice 36 of those injector elements 18' is directed away from the ignitor port 20, while a portion of the oxidizer spray from the first orifices 34 of the same injector elements 18' is directed toward the ignitor port 20. The injector elements 18' in which the inserts 42 are located therefore produce an oxidizer rich zone on that side of the injector element closest to the ignitor port 20.

Figure 7:
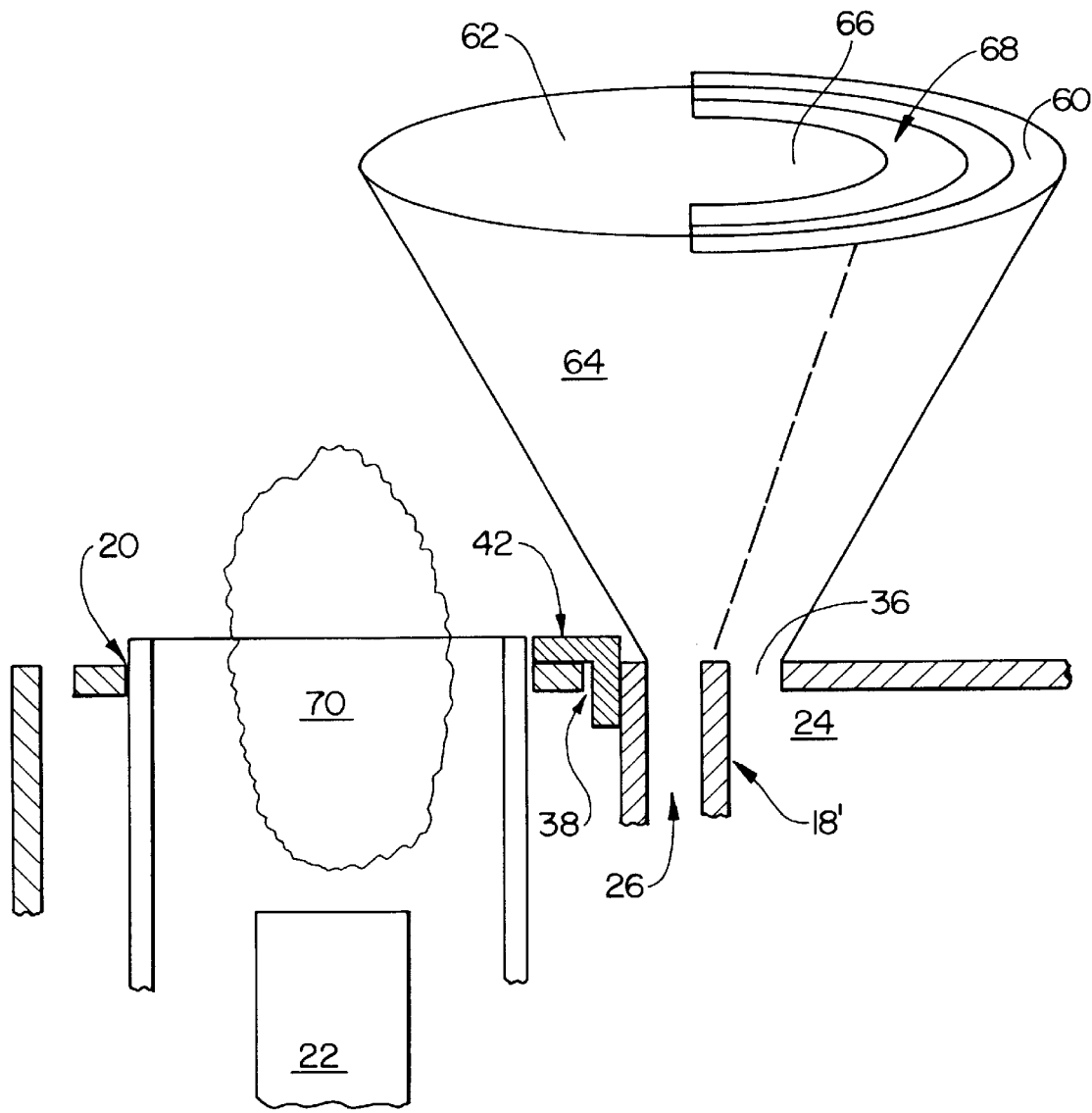
FIG. 7 is a cross-sectional view of one of the injector elements in which an insert is located showing the interaction of the fuel and oxidizer spraying therefrom.

On the side of the injector element 18' furthest from the ignitor port 20, the injector elements 18' in which the inserts 42 are located produce a core spray 66 of oxidizer wrapped in a curtain of fuel 60, as shown in FIG. 7. The shear surface between the oxidizer core spray 66 and the fuel curtain 60 produce a mixing zone 68 which provides a combustible fuel/oxidizer mixture. At engine ignition, the ignitor injects fuel 70 into the oxidizer rich zone 64 created by the first injector elements 18' in which the inserts 42 are located, as shown in FIG. 7. Then, following a spark from the ignitor 22, the fuel is energized to 5000 degrees R, igniting the fuel in the oxidizer rich zone 64, which then propagates to the mixing zone 68 and on to the other injector elements 18.

As those skilled in the art will readily appreciate, the first injector elements 18' in which the inserts 42 are located provide the oxidizer rich zones 64 which are necessary for reliable ignition without the need for the supplemental oxidizer supply system 28 of the prior art. Accordingly, rocket engines incorporating the ignition system of the present invention avoid both the cost and ignition problems associated with the supplemental oxidizer supply system 28 of the prior art, while the eliminating the weight of the supplemental oxidizer supply system 28 from the rocket engine.

Although this invention has been shown and described with respect to a detailed embodiment thereof, it will be understood by those skilled in the art that various changes in form and detail thereof may be made without departing from the spirit and scope of the claimed invention.

We claim:

1. An ignition system for a rocket engine comprising an ignitor, a faceplate having a centrally located ignitor port and first and second annular sections located radially outward of said port, said first annular section located radially inward of said second annular section, said ignitor mounted to said ignitor port, a plurality of first injector elements located in said first annular section of said faceplate and a plurality of second injector elements located in said second annular section, each of said injector elements having a first orifice defining a first flow area, and a second orifice defining a second flow area, said second orifice concentric with and radially outward of said first orifice relative to said first orifice and having a radially inner half and a radially outer half, said radially inner half located between said radially outer half and said ignitor port, each of said first injector elements located equidistant from said ignitor port, and, at least one insert located in the second orifice of one of said first injector elements, thereby reducing the second flow area of the second orifice in which said insert is located, wherein each of said inserts includes a semi cylindrical wall, and said insert is fixedly secured to said faceplate.

2. The rocket engine of claim 1 wherein said insert reduces the second flow area of the second orifice in which said insert is located by 50 percent.

3. The rocket engine of claim 2 wherein said insert is located in the radially inner half of said second orifice.

4. The rocket engine of claim 3 wherein at least half of said first injector elements include said insert.

* * * * *